(12) United States Patent
Lagree et al.

(10) Patent No.: US 11,855,435 B2
(45) Date of Patent: Dec. 26, 2023

(54) ARC FLASH ACCESSORY MODULE

(71) Applicant: EATON INTELLIGENT POWER LIMITED, Dublin (IE)

(72) Inventors: James L. Lagree, Robinson Township, PA (US); Christopher M. Finen, Nashville, TN (US); Patrick Martinez Garcia, Santo Domingo (DO); Xavier Ignacio Pacheco Paulino, Distrito Nacional (DO)

(73) Assignee: EATON INTELLIGENT POWER LIMITED, Dublin (IE)

(*) Notice: Subject to any disclaimer, the term of this patent is extended or adjusted under 35 U.S.C. 154(b) by 143 days.

(21) Appl. No.: 17/548,802

(22) Filed: Dec. 13, 2021

(65) Prior Publication Data

US 2023/0187919 A1     Jun. 15, 2023

(51) Int. Cl.
*H02H 1/00* (2006.01)
*H01H 73/18* (2006.01)

(52) U.S. Cl.
CPC .......... *H02H 1/0023* (2013.01); *H01H 73/18* (2013.01)

(58) Field of Classification Search
CPC ....... H02H 1/0023; H02H 3/083; H01H 73/18
USPC ....................................................... 361/93.1
See application file for complete search history.

(56) References Cited

U.S. PATENT DOCUMENTS

2012/0320486 A1* 12/2012 Lagree ................. H02H 1/0023
  361/115
2017/0138999 A1    5/2017 Kim
2018/0145496 A1    5/2018 Zeller

FOREIGN PATENT DOCUMENTS

CN         108882430 A    * 11/2018
JP          2012060877 A    *   3/2012  .......... H02H 1/0023
WO   WO-2011069297 A1   *   6/2011  ......... G01R 29/0276

OTHER PUBLICATIONS

Machine translation of Lin Chinese Patent Document CN 108882430 A Nov. 23, 2018 (Year: 2018).*
Machine translation of Caggiano et al. Japanese Patent Document JP 2012060877 A Mar. 22, 2012 (Year: 2012).*
European Patent Office "extended European search report" for corresponding European Patent Application No. 22210787.2, dated May 15, 2023, 8 pp.

* cited by examiner

*Primary Examiner* — Kevin J Comber
(74) *Attorney, Agent, or Firm* — Eckert Seamans Cherin & Mellott, LLC (57) ABSTRACT

Systems and methods for tripping open circuit interrupters based on the detection of an arc flash using an accessory arc flash detection module are disclosed. The housing of the arc flash detection module is structured to be installed within the frame of a circuit interrupter. The detection module communicates with light sensors structured to detect light from arc flash events, and includes a controller configured to communicate with an electronic trip unit of the circuit interrupter. In one embodiment, the detection module is configured to alert the electronic trip unit that light indicative of arc flash conditions has been detected such that the electronic trip unit can determine whether or not to initiate a trip after determining the magnitude of current flowing through the circuit interrupter. In another embodiment, the detection module is configured to directly actuate a trip of the circuit interrupter based on the detection of light.

19 Claims, 5 Drawing Sheets

ARC FLASH ACCESSORY MODULE

BACKGROUND

Field

The disclosed concept relates generally to circuit interrupters, and in particular, to arc flash detection devices for use with circuit interrupters.

Background Information

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit interrupters typically include separable contacts. The separable contacts may be operated either manually by way of an operator handle or automatically in response to a detected fault condition. Typically, such circuit interrupters include an operating mechanism, which is designed to rapidly open the separable contacts, and a trip mechanism, such as a trip unit, which senses a number of fault conditions to trip the separable contacts open automatically. Upon sensing a fault condition, the trip unit trips the operating mechanism to a trip state, which moves the separable contacts to their open position.

In a circuit breaker where the insulation has deteriorated or where the breaker is overloaded and overheats, arcing can occur. Arcing can be detrimental to both the circuit interrupter itself and the electrical components connected to it. It is important to minimize the effects of arcing by tripping open the separable contacts as soon as possible after arcing is detected. Currently, only devices external to a circuit breaker can detect light from an arc flash event. In existing circuit breaker systems, these external arc flash detection devices must be wired to another external measurement device that measures the fault current from the event. When an output of light and high current are detected, the external arc flash detection device can force a trip of the circuit breaker by energizing a separate shunt trip accessory.

Figure 1:
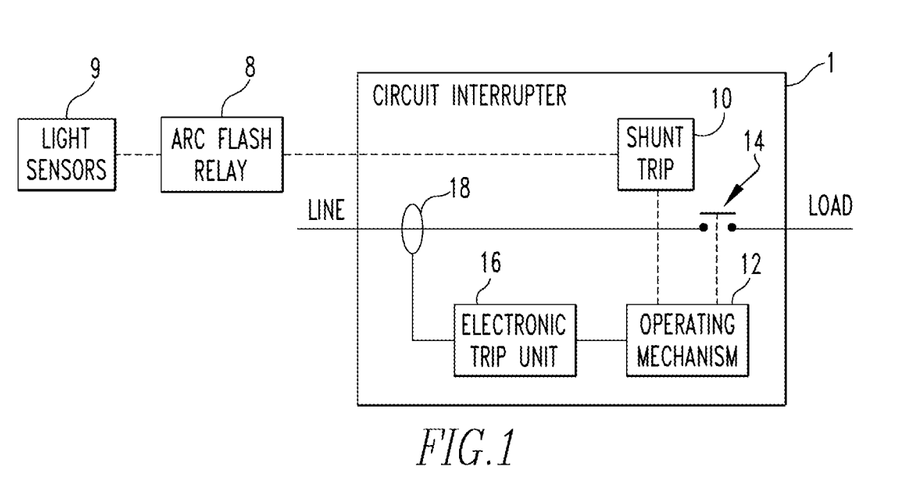
FIG. 1 is a schematic diagram of a circuit interrupter connected to an external arc flash relay device, representative of known arc flash detection systems.

FIG. 1 shows an example of an existing circuit breaker system that uses an arc flash detection device external to the circuit breaker. The circuit interrupter 1 is structured to be electrically connected between LINE and LOAD side conductors. For example, the LINE side conductors may be upstream and the LOAD side conductors may be downstream in the power system the circuit interrupter is utilized in. The circuit interrupter 1 is structured to trip open or switch open to interrupt current flowing between the LINE and LOAD conductors in the event of a fault condition (e.g., without limitation, an arc fault).

Continuing to refer to FIG. 1, an external accessory arc flash relay 8 is electrically connected to a number of external light sensors 9 and an internal shunt trip accessory 10, and the shunt trip accessory 10 is operatively coupled to an operating mechanism 12. When an output of light and high current produced by an arc flash are detected by the external light sensors 9 and/or the external arc flash relay 8, the arc flash relay 8 can force a trip of the circuit interrupter 1 by energizing the shunt trip accessory 10, which in turn actuates the operating mechanism 12 to open a pair of separable contacts 14. The separable contacts 14 are disposed between the LINE and LOAD conductors and are structured to physically separate when actuated by the operating mechanism 12. The operating mechanism 12 is also electrically connected to an electronic trip unit 16 which is structured to monitor power flowing through the circuit interrupter 1 via a current sensor 18 and/or other sensors and to detect other fault (i.e. non-arc fault) conditions based on the power flowing through the circuit interrupter 1. In addition to being structured to trip open the separable contacts 14 upon being actuated by the shunt trip accessory 10 during an arc fault, the operating mechanism 12 is also structured to initiate a trip after receiving a trip initiation signal output by the electronic trip unit 16 upon detection of a fault condition other than an arc fault. While a single phase is illustrated in the circuit interrupter 1 of FIG. 1, and other circuit interrupters described herein, it will be appreciated that the circuit interrupters may have multiple phases, such as three phases, and may have corresponding components such as separable contacts and current sensors corresponding to each phase.

Compared to the time that it takes for the trip unit 16 to energize the trip actuator of the operating mechanism 12 to open the separable contacts 14 when a non-arc fault is detected, using a shunt trip 10 to open the breaker 1 in the event of an arc fault as the system shown in FIG. 1 does delays opening time, thus leading to increased arcing time. In addition, the need for several external devices in this particular arc flash detection setup is very expensive, and a great deal of work is required to wire and mount these devices for arc flash detection.

There is thus room for improvement in systems and methods used to detect arc flash events and trip circuit interrupters quickly based on detection of arc flash events.

SUMMARY

These needs and others are met by embodiments of the disclosed concept in which an accessory arc flash detection module for use with a circuit interrupter includes a housing structured to be installed within the circuit interrupter, and includes light sensors structured to be disposed externally to the circuit interrupter in order to detect arc flash events. The arc flash accessory module is configured to communicate with an electronic trip unit of the circuit interrupter, and can either indirectly or directly initiate a trip of the circuit interrupter upon detection of an arc flash by the light sensors.

In accordance with one aspect of the disclosed concept, an arc flash detection module for use in a circuit interrupter comprises a housing, a plurality of light sensors disposed externally to the housing, a controller configured to monitor a number of characteristics of the light sensors, and a communication channel configured to facilitate electrical communication between the controller and an electronic trip unit of the circuit interrupter. The arc flash detection module is configured to be coupled to a frame of the circuit interrupter such that the housing is disposed within an interior of the circuit interrupter.

In accordance with another aspect of the disclosed concept, a circuit interrupter comprises a frame, a line side structured to electrically connect to a power source, a load side structured to electrically connect to a load, separable contacts electrically connected between the line side and the load side, an operating mechanism structured to open and close the separable contacts, an electronic trip unit structured to actuate the operating mechanism, and an arc flash detection module in electrical communication with the electronic trip unit. The arc flash detection module comprises a housing, a plurality of light sensors disposed externally to the housing, a controller configured to monitor a number of characteristics of the light sensors, and a communication channel configured to facilitate electrical communication between the controller and an electronic trip unit of the circuit interrupter. The arc flash detection module is configured to be coupled to the frame of the circuit interrupter such that the housing is disposed within an interior of the circuit interrupter.

In accordance with another aspect of the disclosed concept, a method of tripping open a circuit interrupter comprises first operatively coupling an arc flash detection module to the circuit interrupter. The arc flash detection module comprises a housing, a plurality of light sensors disposed externally to the housing, a controller configured to monitor a number of characteristics of the light sensors, and a communication channel configured to facilitate electrical communication between the controller and an electronic trip unit of the circuit interrupter. The method further comprises using the controller to monitor characteristics of the light sensors to determine if changes to the characteristics have occurred, and using the controller to actuate an operating mechanism of the circuit interrupter to open separable contacts of the circuit interrupter if the monitoring indicates that arc flash conditions exist.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As used herein, the singular form of "a", "an", and "the" include plural references unless the context clearly dictates otherwise.

As used herein, the term "number" shall mean one or an integer greater than one (i.e., a plurality).

Directional phrases used herein, such as, for example, left, right, front, back, top, bottom and derivatives thereof, relate to the orientation of the elements shown in the drawings and are not limiting upon the claims unless expressly recited therein.

As used herein, the term "controller" shall mean a number of programmable analog and/or digital devices (including an associated memory part or portion) that can store, retrieve, execute and process data (e.g., software routines and/or information used by such routines), including, without limitation, a field programmable gate array (FPGA), a complex programmable logic device (CPLD), a programmable system on a chip (PSOC), an application specific integrated circuit (ASIC), a microprocessor, a microcontroller, a programmable logic controller, or any other suitable processing device or apparatus. The memory portion can be any one or more of a variety of types of internal and/or external storage media such as, without limitation, RAM, ROM, EPROM(s), EEPROM(s), FLASH, and the like that provide a storage register, i.e., a non-transitory machine readable medium, for data and program code storage such as in the fashion of an internal storage area of a computer, and can be volatile memory or nonvolatile memory.

As employed herein, the statement that two or more parts are "coupled" together shall mean that the parts are joined together either directly or joined through one or more intermediate parts.

Figure 2:
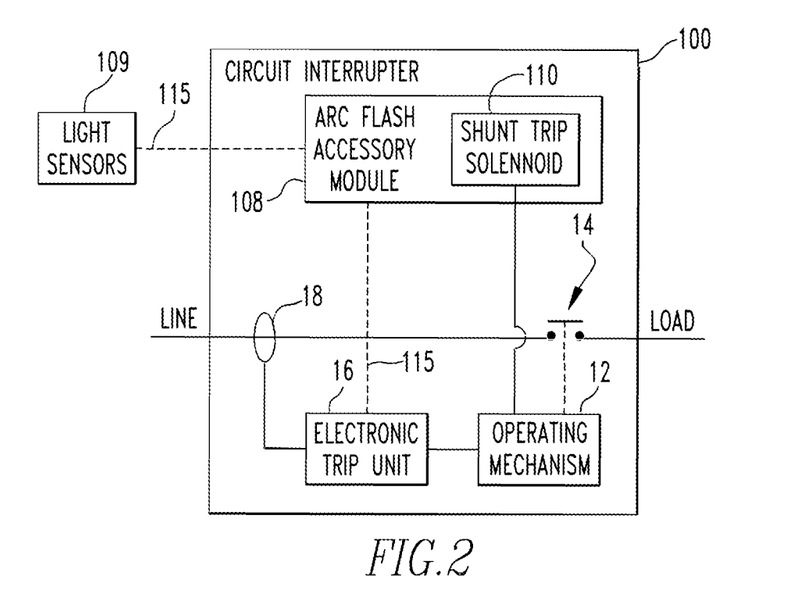
FIG. 2 is a schematic diagram of a circuit interrupter including an internal arc flash detection module, in accordance with example embodiments of the disclosed concept.

FIG. 2 is a schematic diagram of a circuit interrupter 100 (e.g., without limitation, a circuit breaker) in accordance with example embodiments of the disclosed concept. The circuit interrupter 100 includes several of the same features as the circuit interrupter 1 shown in FIG. 1, and it will be appreciated that components with the same reference numbers in multiple figures function substantially the same. In contrast with circuit interrupter 1 shown in FIG. 1, circuit interrupter 100 shown in FIG. 2 includes an accessory arc flash detection module 108 disposed internally to the circuit interrupter 100, instead of the arc flash relay 8 disposed externally to circuit interrupter 1 in FIG. 1. The arc flash detection module 108 can communicate with a number of external light sensors 109 as well as components internal to circuit interrupter 100 (e.g. electronic trip unit 16) via a number of communication channels 115. Communication channel(s) 115, as well as the operation of arc flash detection module 108 and a shunt trip solenoid 110 that is included in some example embodiments of arc flash detection module 108, are detailed later herein with respect to FIG. 4 and FIG. 5.

Figure 3:
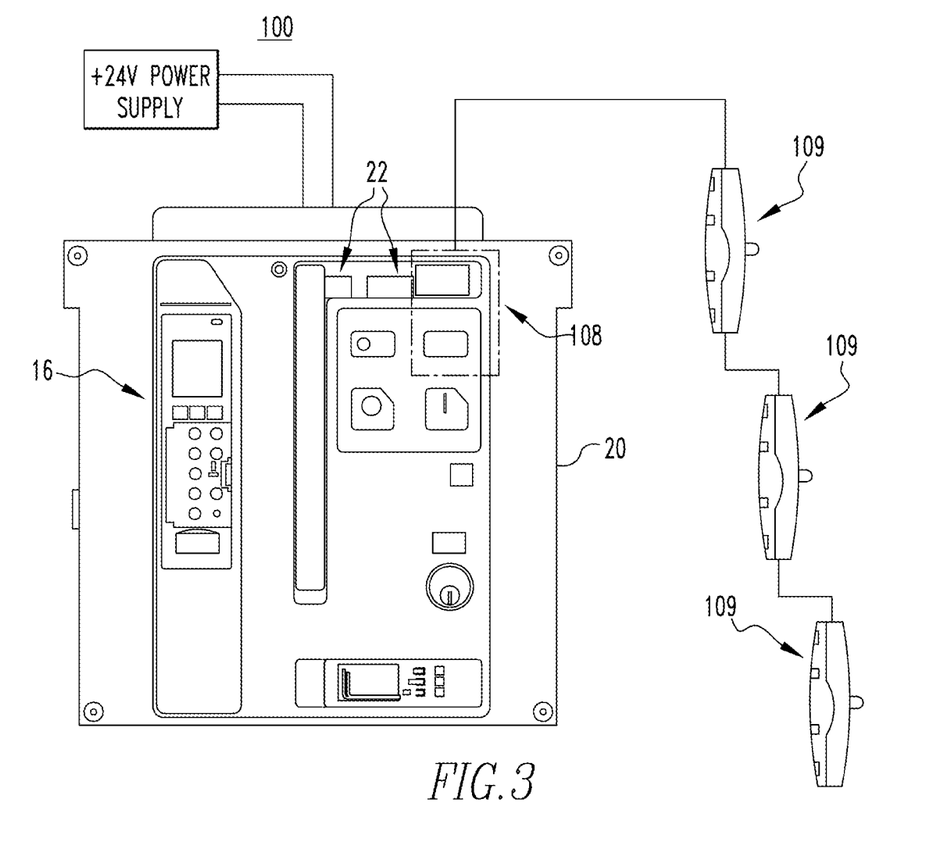
FIG. 3 is a diagram of the exterior of the circuit interrupter shown in FIG. 2.

Referring now to FIG. 3, some circuit interrupters (such as circuit interrupter 100) include frames 20 structured to accommodate the insertion of a plurality of modular accessory devices such as shunt trip, spring release, and under voltage relay devices, among others. These accessories are modular in the sense that any one of the accessory device types can be interchangeably inserted into any one of a number of accessory mountings 22 formed in the circuit interrupter frame 20. In FIG. 3, two empty accessory mountings 22 are shown next to the accessory mounting 22 in which arc flash detection module 108 is mounted. Forming the frame 20 of circuit interrupter 100 with accessory mountings 22 enables the circuit interrupter 1 to be customized for the needs of each individual customer with easy-to-implement field upgrades. Accordingly, it should be understood that arc flash detection module 108 is structured to be inserted into an accessory mounting 22 formed in the frame 20 of circuit interrupter 1 as shown in FIG. 3.

Figure 4:
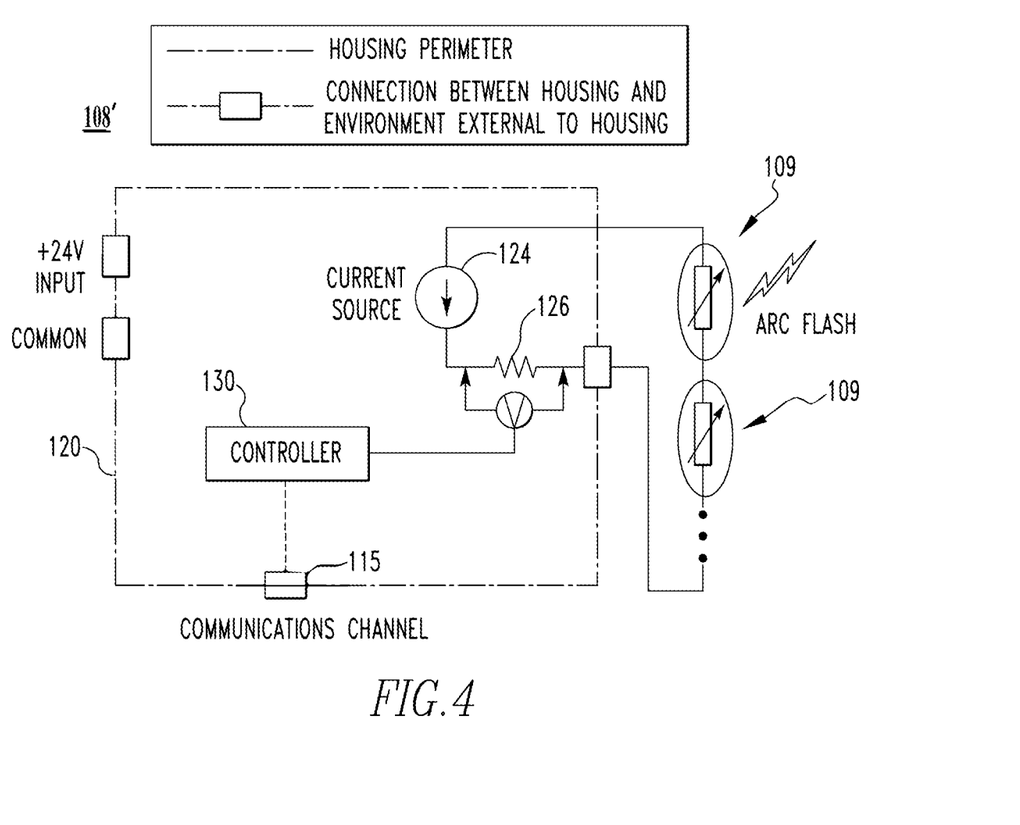
FIG. 4 is a schematic diagram of a first variation of the arc flash detection module for use with the circuit interrupter shown in FIG. 2, in accordance with an example embodiment of the disclosed concept.
Figure 5:
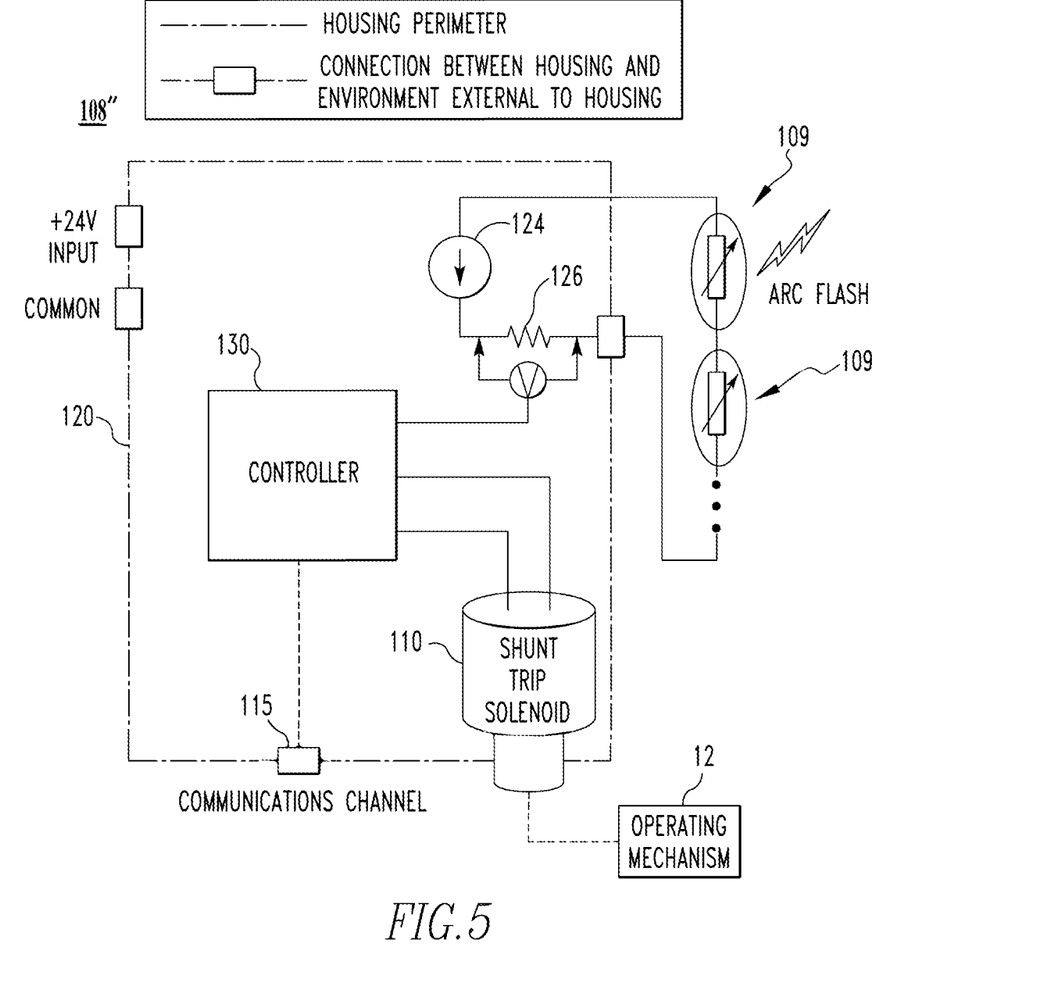
FIG. 5 is a schematic diagram of a second variation of the arc flash detection module for use with the circuit interrupter shown in FIG. 2, in accordance with an example embodiment of the disclosed concept.

FIGS. 4 and 5 show schematic diagrams of two embodiments 108' and 108" of the arc flash detection module 108 in accordance with example embodiments of the disclosed concept. Both embodiments 108' and 108" of arc flash detection module 108 can be referred to generally as arc flash detection module 108. As previously stated in the Background section, currently, only devices external to a circuit breaker can detect light from an arc flash event, and these known external arc flash detection devices can only force a trip of the circuit breaker by energizing yet another separate device, a shunt trip accessory. This setup of several external devices is expensive, requires a great deal of work to wire and mount all of the separate devices, and delays opening of the separable contacts 14 during an arc fault. The devices disclosed herein (i.e. circuit interrupter 100, arc flash detection modules 108) provide a better, more streamlined solution and a novel method for bringing arc flash detection and measurement functions into circuit breakers and opening circuit breakers faster during an arc fault event, due to the arc flash detection module 108 being either in direct communication with the trip unit 16 or directly operatively coupled to the operating mechanism 12, as detailed further herein below.

Still referring to FIG. 4 and FIG. 5, embodiments 108' and 108" of arc flash accessory module 108 both include several of the same elements, with the primary distinction between module 108' and module 108" being the inclusion of shunt trip solenoid 110 in module 108", solenoid 110 being described in more detail herein below. While shunt trip solenoid 110 is included in FIG. 2, it should be noted that either embodiment 108' or 108" of arc flash detection module 108 can be included in circuit interrupter 100, and that if embodiment 108' is included in circuit interrupter 100, then solenoid 110 will be omitted, and there will be no direct connection between arch flash module 108 and operating mechanism 12. Below, the features common to both arc flash accessory modules 108 are detailed first and discussed using the reference number 108, and the features unique to each of the embodiments 108' and 108" are detailed afterward using the respective reference numbers 108' and 108".

Continuing to refer to both FIG. 4 and FIG. 5, both arc flash detection accessory modules 108 comprise a housing 120 (also denoted by the notation "housing perimeter" in the figure legends) that houses several components within the interior of the housing 120. In addition, both embodiments 108' and 108" include some components disposed externally to the housing 120, and as shown in the figures, the accessory housing 120 is also structured to include several points of connection or communication between the accessory housing 120 and the environment external to the housing 120. For example, both arc flash accessory modules 108 include a plurality of series-connected light sensors 109 that are disposed externally to the housing 120, as well as externally to the frame 20 of the circuit interrupter 100, and are positioned to be exposed to the light of any arc flashes that originate from the circuit interrupter 100.

In an exemplary embodiment, light sensors 109 are light dependent resistors (LDRs), i.e. photoresistors, whose impedance decreases as any proximate light increases in brightness/intensity. Changes in the impedance of photoresistor light sensors 109 can be detected by using any one of many known circuits. For example, a current source 124 and a fixed resistor 126 can be placed in series with the light sensors 109 (as shown in FIGS. 3 and 4) in order to form a voltage divider, since the fixed resistance of resistor 126 and the fixed current provided by current source 124 will result in the voltage across resistor 126 changing to offset any changes in the impedance of light sensors 109 resulting from light-producing events that originate in the circuit interrupter 1, in accordance with Ohm's law: V=IR. In an exemplary embodiment, the current source 124 is a 4-20 mA source.

Both arc flash accessory modules 108 include a controller 130 and a two wire connection for connecting to a power source in order to power the current source 124 and the controller 130. In an exemplary embodiment, the arc flash module 108 is designed to be used with standard power sources generally used to power digital control devices, such as +24V DC (as shown in FIGS. 4 and 5), or 115V/230V AC. Controller 130 can comprise, for example and without limitation, a microcontroller. Controller 130 implements digital logic in order to, for example and without limitation, monitor the voltage across fixed resistor 126, and communicates with electronic trip unit 16 via communication channel 115. In an exemplary embodiment, communication channel 115 is a control area network (CAN) channel. However, it will be appreciated that communication channel 115 can be used to implement communication standards other than CAN without departing from the scope of the disclosed concept. Communication channel 115 is a multi-wire connection that facilitates bilateral communication between controller 130 and electronic trip unit 16. Controller 130 in particular may transmit signals to electronic trip unit 16 that indicate, for example and without limitation, whether an arc flash has been detected by the arc flash module 108, how many light sensors 109 are activated, if the module 108 is enabled/turned off/in a standby mode, if the module 108 is healthy/working, if there is any error with the light sensors 109, or if any light sensors 109 have been added or removed.

Referring now specifically to embodiment 108' shown in FIG. 4, controller 130 is programmed to send an arc flash alert signal to electronic trip unit 16 if the resistance of light sensors 109 (as determined based on the voltage across fixed resistor 126) indicates the likely presence of arc flash light originating from the circuit interrupter 100. The electronic trip unit 16 is configured to then check the current through the circuit interrupter 100 using current sensor 18 (or another suitable mechanism). If the current through the circuit interrupter 100 is in excess of a predetermined acceptable threshold level, then the trip unit 16 can initiate a trip by actuating the operating mechanism 12. It will be appreciated that trip unit 16 can accept user input, and that a user may choose the threshold current that should be used to initiate a trip due to arc flash detection. For example and without limitation, it is likely that a current of 2 to 10 times the rated normal operating current would be an appropriate threshold level for initiating a trip due to an arc flash. In addition, it will be appreciated that controller 130 can be programmed to only send an arc flash alert signal to electronic trip unit 16 if the impedance of sensors 109 indicates the presence of light above a predetermined threshold intensity, i.e. an intensity indicative of an arc flash condition.

Referring now specifically to embodiment 108" shown in FIG. 5, module 108" includes a shunt trip solenoid 110 that is omitted from module 108'. Shunt trip solenoid 110 is operatively coupled to the operating mechanism 12 of circuit interrupter 100. In contrast to module 108', after determining that the impedance of sensors 109 indicates the presence of arc flash light, the controller 130 of module 108" can energize the shunt trip solenoid 110 so that solenoid 110 can directly actuate operating mechanism 12 to open the separable contacts 18, rather than sending a signal to electronic trip unit 16 so that trip unit 16 has to actuate operating mechanism 12. Thus, the inclusion of shunt trip solenoid 110 in module 108" provides a mechanism whereby module 108" can directly actuate the operating mechanism 12 to open the separable contacts 18, without using the electronic trip unit 16 at all, whereas the electronic trip unit 16 must initiate the opening of the separable contacts 18 when module 108' is used.

It is expected that module 108" would be used instead of module 108', for example and without limitation, when it is desired to trip open the separable contacts 18 based only upon the detection of light (as opposed to the detection of both light and high current), and that module 108' would be used when both the detection of light and high current are desired for tripping open the separable contacts 18. It will be appreciated that in both module 108' and module 108", the controller 130 transmits a signal that leads to the separable contacts 18 being tripped open if arc flash conditions are detected based on the monitoring of light sensors 109, but with module 108', the electronic trip unit 16 makes the final determination about whether to actuate the trip, whereas with module 108", the controller 130 makes the final determination about whether to actuate the trip. It will also be appreciated that, although embodiment 108" does not require electronic trip unit 16 to trip open the separable contacts 18 in the event of arc flash detection, bilateral communication between the controller 130 and the electronic trip unit 16 along communication channel 115 is still of value in embodiment 10", as it may be desired for the controller 130 to inform the electronic trip unit 16 that the controller 130 initiated a trip due to a detected arc flash, and the controller 130 and the trip unit 16 may need to communicate about various other matters, as described herein below.

Referring again to both embodiments of arc flash accessory module 108, in addition to evaluating the voltage across fixed resistor 126 to determine the presence or lack thereof of an arc flash, the controller 130 can use the voltage across fixed resistor 126 to determine what the current through the sensors 109 is in order to determine whether the sensors 109 are functioning properly. For example, if the controller 130 determines that the current through the sensors 109 is zero, then the controller 130 can issue an alert that the sensors should be evaluated to determine if the sensors 109 are disconnected or if a wire connecting the sensors 109 to the internal circuitry of module 108 is broken. Furthermore, the bilateral communication between the controller 130 and electronic trip unit 16 via communication channel 115 enables the trip unit 16 to tell the controller 130 that a trip has already been initiated, in which case the controller 130 can ignore any light detected by the sensors 109, as the light is likely attributable to arcing between the separable contacts 18 resulting from opening of the contacts 18.

Figure 6:
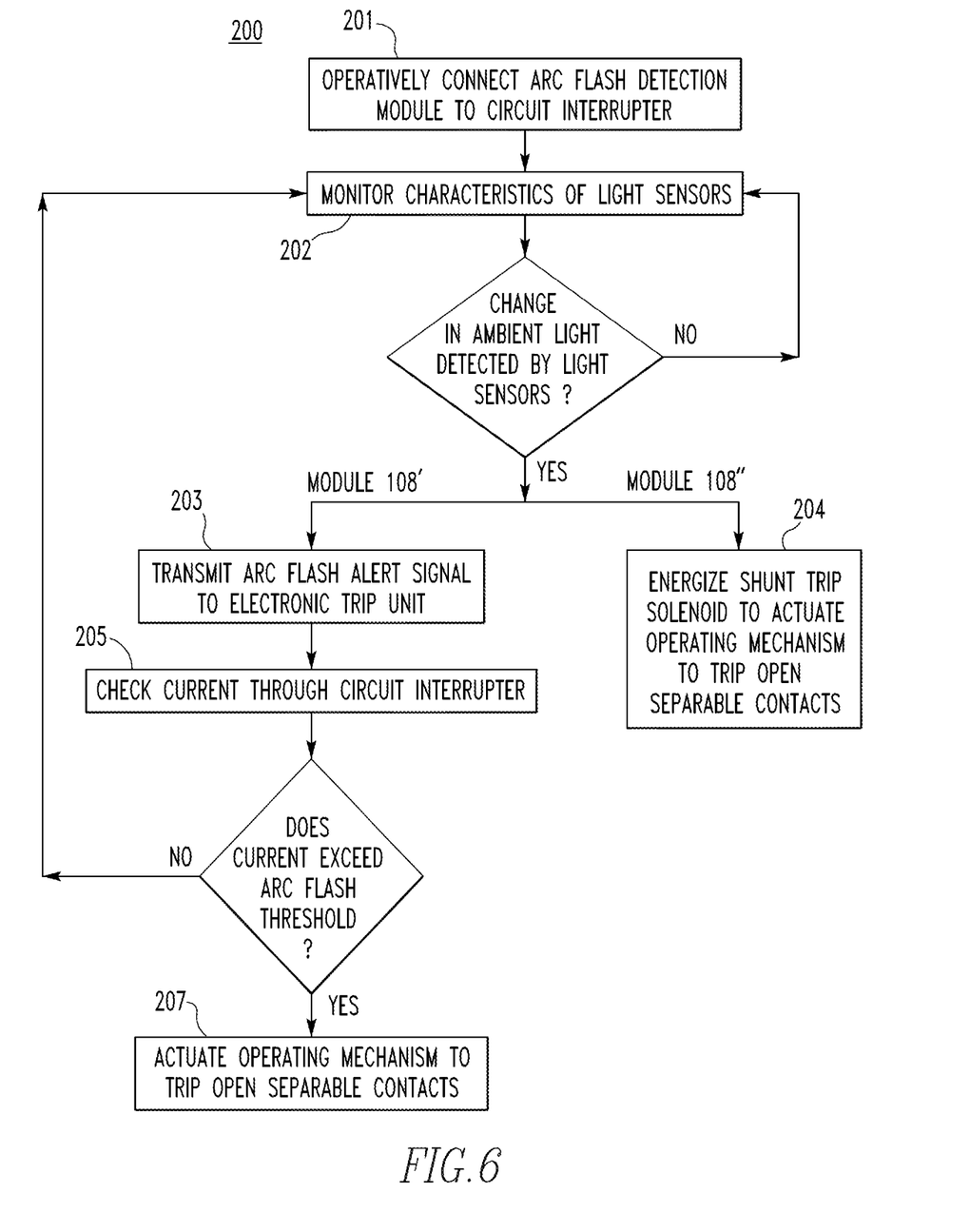
FIG. 6 is a flow chart of a method for tripping open a circuit interrupter based on the detection of an arc flash using an arc flash detection module installed within a circuit breaker, in accordance with example embodiments of the disclosed concept.

Referring now to FIG. 6, a flowchart of a method 200 for tripping open a circuit interrupter based on the detection of an arc flash using an accessory arc flash detection module is shown, in accordance with example embodiments of the disclosed concept. The method of FIG. 6 may be employed, for example, with the circuit interrupter 100 shown in FIG. 2 and the arc flash detection modules 108 depicted in FIGS. 4 and 5. However, it will be appreciated that the method may be employed in other devices as well without departing from the scope of the disclosed concept.

The method begins at 201 where the arc flash detection module 108 is operatively coupled to the circuit interrupter 1. Due to the modular design of the arc flash detection module 108 and corresponding accessory mounting 22 formed in the frame 20 of circuit interrupter 100, operatively coupling the arc flash detection module 108 to the circuit interrupter 100 essentially only entails inserting the module 108 into the accessory mounting 22 of circuit interrupter 100. At 202, the controller 130 monitors the characteristics of the light sensors 109 to determine if the characteristics are indicative of the presence of an arc flash, i.e. the controller determines whether the intensity of any light sensed by light sensors 109 is great enough to be indicative of the presence of an arc flash. Monitoring the characteristics of the light sensors can comprise, for example and without limitation, monitoring the voltage across fixed resistor 126 in order to determine the impedance of the photoresistor light sensors 109. If the characteristics of light sensors 109 indicate detection of arc flash light, then the method proceeds to either step 203 or step 204, depending on whether embodiment 108' or embodiment 108" of arc flash detection module 108 is being used.

If embodiment 108' is being used, then the method proceeds to 203, where the controller 130 transmits an arc flash alert signal to the electronic trip unit 16, and subsequently proceeds to 205, where the electronic trip unit 16 checks the current flowing through the circuit interrupter 1. If the current exceeds a predetermined threshold, then the trip unit 16 actuates the operating mechanism 12 to trip open the separable contacts 18. Referring back to step 202, if a change to the impedance of the light sensors 202 was detected and embodiment 108" is being used, then the method proceeds to 204, where the controller 130 energizes the shunt trip solenoid 110 in order to actuate the operating mechanism 12 to trip open the separable contacts 18.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof

What is claimed is:

1. An arc flash detection module for use in a circuit interrupter, the arc flash detection module comprising:
   a housing;
   a plurality of light sensors disposed externally to the housing;
   a controller configured to monitor a number of characteristics of the light sensors; and
   a communication channel configured to facilitate electrical communication between the controller and an electronic trip unit of the circuit interrupter,
   wherein the arc flash detection module is configured to be coupled to a frame of the circuit interrupter via insertion into an accessory mounting structured to enable insertion of a modular accessory device, such that the housing is disposed within an interior of the circuit interrupter.

2. The arc flash detection module of claim 1,
   wherein the controller is configured to transmit an arc flash alert signal to the electronic trip unit if the number of characteristics of the light sensors indicates the presence of an arc flash condition.

3. The arc flash detection module of claim 2, further comprising:
   a current source electrically connected in series with the light sensors; and
   a fixed resistor electrically connected in series with the current source and the light sensors,
   wherein the plurality of light sensors are photoresistors whose impedance changes when light proximate to the light sensors changes in intensity,
   wherein the controller is configured to monitor the voltage across the fixed resistor and to transmit the arc flash alert signal based on the voltage across the fixed resistor.

4. The arc flash detection module of claim 1, further comprising:
a shunt trip solenoid operatively coupled to an operating mechanism of the circuit interrupter,
wherein the controller is configured to energize the shunt trip solenoid to actuate the operating mechanism to trip open separable contacts of the circuit interrupter if the number of characteristics of the light sensors indicates the presence of an arc flash.

5. The arc flash detection module of claim 4, wherein the shunt trip solenoid is directly operatively coupled to the operating mechanism such that the electronic trip unit does not actuate the operating mechanism when the number of characteristics of the light sensors indicates the presence of an arc flash.

6. The arc flash detection module of claim 4, further comprising:
a current source electrically connected in series with the light sensors; and
a fixed resistor electrically connected in series with the current source and the light sensors,
wherein the light sensors are photoresistors whose impedance changes when light proximate to the light sensors changes in intensity,
wherein the controller is configured to monitor the voltage across the fixed resistor and to energize the shunt trip solenoid to actuate the operating mechanism based on the voltage across the fixed resistor.

7. A circuit interrupter comprising:
a frame formed with an accessory mounting structured to enable insertion of a modular accessory device;
a line side structured to electrically connect to a power source;
a load side structured to electrically connect to a load;
separable contacts electrically connected between the line side and the load side;
an operating mechanism structured to open and close the separable contacts;
an electronic trip unit structured to actuate the operating mechanism; and
an arc flash detection module in electrical communication with the electronic trip unit, the arc flash detection module comprising:
a housing;
a plurality of light sensors disposed externally to the housing;
a controller configured to monitor a number of characteristics of the light sensors; and
a communication channel configured to facilitate electrical communication between the controller and an electronic trip unit of the circuit interrupter,
wherein the arc flash detection module is configured to be coupled to the frame of the circuit interrupter, via insertion into the accessory mounting, such that the housing is disposed within an interior of the circuit interrupter.

8. The circuit interrupter of claim 7,
wherein the controller is configured to transmit an arc flash alert signal to the electronic trip unit if the number of characteristics of the light sensors indicates the presence of an arc flash condition.

9. The circuit interrupter of claim 8, wherein the arc flash detection module further comprises:
a current source electrically connected in series with the light sensors; and
a fixed resistor electrically connected in series with the current source and the light sensors,
wherein the plurality of light sensors are photoresistors whose impedance changes when light proximate to the light sensors changes in intensity,
wherein the controller is configured to monitor the voltage across the fixed resistor and to transmit the arc flash alert signal based on the voltage across the fixed resistor.

10. The circuit interrupter of claim 7, wherein the arc flash detection module further comprises:
a shunt trip solenoid operatively coupled to the operating mechanism of the circuit interrupter,
wherein the controller is configured to energize the shunt trip solenoid to actuate the operating mechanism to trip open separable contacts if the number of characteristics of the light sensors indicates the presence of an arc flash.

11. The circuit interrupter of claim 10, wherein the shunt trip solenoid is directly operatively coupled to the operating mechanism such that the electronic trip unit does not actuate the operating mechanism when the number of characteristics of the light sensors indicates the presence of an arc flash.

12. The circuit interrupter of claim 10, wherein the arc flash detection module further comprises:
a current source electrically connected in series with the light sensors; and
a fixed resistor electrically connected in series with the current source and the light sensors,
wherein the light sensors are photoresistors whose impedance changes when light proximate to the light sensors changes in intensity,
wherein the controller is configured to monitor the voltage across the fixed resistor and to energize the shunt trip solenoid to actuate the operating mechanism based on the voltage across the fixed resistor.

13. A method of tripping open a circuit interrupter, the method comprising:
operatively coupling an arc flash detection module to the circuit interrupter by inserting the arc flash detection module into an accessory mounting formed in the frame of the circuit interrupter and structured to receive a modular accessory device, the arc flash detection module comprising:
a housing;
a plurality of light sensors disposed externally to the housing;
a controller configured to monitor a number of characteristics of the light sensors; and
a communication channel configured to facilitate electrical communication between the controller and an electronic trip unit of the circuit interrupter;
monitoring, with the controller, characteristics of the light sensors to determine if changes to the characteristics have occurred; and
actuating an operating mechanism of the circuit interrupter to open separable contacts of the circuit interrupter, with the controller, if the monitoring indicates that arc flash conditions exist.

14. The method of claim 13, wherein operatively coupling the arc flash detection module to the circuit interrupter comprises inserting the arc flash detection module into an accessory mounting formed within a frame of the circuit breaker such that the housing is disposed within an interior of the circuit interrupter.

15. The method of claim 13, further comprising:
transmitting, with the controller, an arc flash alert signal to the electronic trip unit; and determining, with the electronic trip unit, a current flowing through the circuit interrupter, wherein the actuating of the operating mechanism to open the separable contacts only occurs if the electronic trip unit determines that the current exceeds a predetermined threshold.

16. The method of claim 15, wherein the arc flash detection module further comprises:

a current source electrically connected in series with the light sensors; and a fixed resistor electrically connected in series with the current source and the light sensors, wherein the plurality of light sensors are photoresistors whose impedance changes when light proximate to the light sensors changes in intensity, and wherein the monitoring comprises determining a voltage across the fixed resistor, and wherein the transmitting of the arc flash alert signal is based upon the monitoring.

17. The method of claim 13, wherein the arc flash detection module further comprises a shunt trip solenoid in electrical communication with the controller, the method further comprising:

energizing the shunt trip solenoid, with the controller, to actuate the operating mechanism to trip open the separable contacts if the monitoring indicates that arc flash conditions exist.

18. The method of claim 17, wherein the arc flash detection module further comprises:

a current source electrically connected in series with the light sensors; and a fixed resistor electrically connected in series with the current source and the light sensors, wherein the plurality of light sensors are photoresistors whose impedance changes when light proximate to the light sensors changes in intensity, and wherein the monitoring comprises determining a voltage across the fixed resistor, and wherein the energizing of the shunt trip solenoid is based on the monitoring.

19. The method of claim 13, wherein the arc flash detection module further comprises:

a current source electrically connected in series with the light sensors; and a fixed resistor electrically connected in series with the current source and the light sensors, wherein the plurality of light sensors are photoresistors whose impedance changes when light proximate to the light sensors changes in intensity, and wherein the monitoring comprises determining a voltage across the fixed resistor.

* * * * *